United States Patent
O'Neil

(10) Patent No.: US 9,436,674 B2
(45) Date of Patent: *Sep. 6, 2016

(54) SIGNAL PROCESSING APPROACH TO SENTIMENT ANALYSIS FOR ENTITIES IN DOCUMENTS

(71) Applicant: Attivio, Inc., Newton, MA (US)
(72) Inventor: John O'Neil, Watertown, MA (US)
(73) Assignee: Attivio, Inc., Newton, MA (US)
( * ) Notice: Subject to any disclaimer, the term of this patent is extended or adjusted under 35 U.S.C. 154(b) by 241 days.

This patent is subject to a terminal disclaimer.

(21) Appl. No.: 14/270,507
(22) Filed: May 6, 2014

(65) Prior Publication Data
US 2014/0257796 A1 Sep. 11, 2014

Related U.S. Application Data
(63) Continuation of application No. 12/752,053, filed on Mar. 31, 2010, now Pat. No. 8,725,494.

(51) Int. Cl.
*G06F 17/27* (2006.01)
*G06F 17/30* (2006.01)

(52) U.S. Cl.
CPC ......... *G06F 17/278* (2013.01); *G06F 17/2765* (2013.01); *G06F 17/2785* (2013.01); *G06F 17/30684* (2013.01)

(58) Field of Classification Search
CPC ............... G06F 17/2785; G06F 17/30268; G06F 17/27; G06F 17/30253; G06F 17/3061; G06F 17/30722; G06F 17/30731; G06F 17/30876
See application file for complete search history.

(56) References Cited

U.S. PATENT DOCUMENTS

| | | | | |
|---|---|---|---|---|
| 6,892,179 B1* | 5/2005 | Zacharia | G06Q 10/04 | 705/4 |
| 7,523,085 B2* | 4/2009 | Nigam | G06F 17/274 | 706/55 |
| 7,788,087 B2* | 8/2010 | Corston-Oliver | G06F 17/274 | 704/10 |
| 7,865,354 B2* | 1/2011 | Chitrapura | G06F 17/2785 | 704/4 |
| 8,010,539 B2* | 8/2011 | Blair-Goldensohn | G06F 17/30719 | 704/9 |
| 8,200,477 B2* | 6/2012 | Yi | G06F 17/2715 | 704/1 |
| 8,239,189 B2* | 8/2012 | Skubacz | G06F 17/2785 | 704/10 |
| 2005/0091038 A1* | 4/2005 | Yi | G06F 17/2715 | 704/10 |
| 2006/0069589 A1* | 3/2006 | Nigam | G06Q 30/02 | 706/55 |
| 2006/0200341 A1* | 9/2006 | Corston-Oliver | G06F 17/274 | 704/5 |
| 2006/0200342 A1* | 9/2006 | Corston-Oliver | G06F 17/274 | 704/10 |
| 2007/0078671 A1* | 4/2007 | Dave | G06Q 10/10 | 706/45 |
| 2008/0154883 A1* | 6/2008 | Chowdhury | G06F 3/0482 | |
| 2008/0249764 A1* | 10/2008 | Huang | G06F 17/2785 | 704/9 |
| 2008/0270116 A1* | 10/2008 | Godbole | G06F 17/279 | 704/9 |
| 2009/0216524 A1* | 8/2009 | Skubacz | G06F 17/2785 | 704/9 |
| 2009/0319342 A1* | 12/2009 | Shilman | G06F 17/30864 | 705/7.41 |
| 2011/0161071 A1* | 6/2011 | Duong-van | G06F 17/2785 | 704/9 |
| 2011/0208522 A1* | 8/2011 | Pereg | G06F 17/279 | 704/235 |
| 2015/0356090 A1* | 12/2015 | Birnbaum | G06F 17/3053 | 707/723 |

* cited by examiner

Primary Examiner — Michael Ortiz Sanchez
(74) Attorney, Agent, or Firm — Patent GC LLC

(57) ABSTRACT

A document can be processed to provide sentiment values for phrases in the document. The sequence of sentiment values associated with the sequence of phrases in a document can be handled as if they were a sampled discrete time signal. For phrases which have been identified as entities, a filtering operation can be applied to the sequence of sentiment values around each entity to determine a sentiment value for the entity.

20 Claims, 8 Drawing Sheets

| token | phrase | entity | sentiment |
|---|---|---|---|
| I | | | −0.3091 |
| saw | | | |
| the | start-NP | | |
| stage | in-NP | | −0.1887 |
| version | end-NP | | 0.0902 |
| of | | | |
| " | | | |
| Mamma | start-NP | | −0.1404 |
| Mia | end-NP | | 0.964 |
| ! | | | |
| " | | | |
| in | | | |
| London | single-NP | single-LOC | −0.3158 |
| , | | | |
| where | | | 0.7554 |
| for | | | |
| all | | | −0.3240 |
| I | | | |
| know | | | −0.2941 |
| , | | | |
| it | | | 0.2115 |
| is | | | 0.0590 |
| now | | | −0.6689 |
| entering | | | 0.3665 |
| the | start-NP | | |
| second | in-NP | | −0.5299 |
| century | end-NP | | −0.2874 |
| of | | | |
| its | start-NP | | −0.0765 |
| run | end-NP | | −0.1006 |
| , | | | |
| and | | | |
| I | | | |
| was | | | −0.2984 |
| underwhelmed | | | 1.5515 |
| . | | | |

FIG. 1A

| token | phrase | entity | sentiment |
|---|---|---|---|
| The | start-NP | | |
| film | in-NP | | 0.3904 |
| version | end-NP | | 0.0902 |
| has | | | −0.03172 |
| the | start-NP | | |
| advantage | end-NP | | 0.3361 |
| of | | | |
| possessing | | | −0.1165 |
| Meryl | start-NP | start-PER | 0.0982 |
| Streep | end-NP | end-PER | 0.0059 |
| , | | | |
| Pierce | start-NP | start-PER | −0.0489 |
| Brosnan | end-NP | end-PER | 0.4699 |
| , | | | |
| Amanda | start-NP | start-PER | −0.1734 |
| Seyfried | end-NP | end-PER | |
| , | | | |
| Colin | start-NP | start-PER | −0.2989 |
| Firth | end-NP | end-PER | 1.3133 |
| and | | | |
| Julie | start-NP | start-PER | −0.8676 |
| Walters | end-NP | end-PER | −0.5299 |
| , | | | |
| but | | | −0.3269 |
| their | start-NP | | −0.5479 |
| assets | start-NP | | −0.6164 |
| are | | | −0.3490 |
| stretched | | | −0.5814 |
| fairly | | | 0.0528 |
| thin | | | −0.6098 |
| . | | | |

FIG. 1B

| token | phrase | entity | sentiment |
|---|---|---|---|
| And | | | |
| there | | | −0.1543 |
| are | | | −0.3490 |
| the | start-NP | | |
| wall-to-wall | in-NP | | 0.8481 |
| songs | end-NP | | 0.205 |
| by | | | 0.0169 |
| ABBA | single-NP | single-ORG | 0.0919 |
| , | | | |
| if | | | −1.1971 |
| you | | | 0.1172 |
| like | | | −0.0491 |
| that | start-NP | | −0.3645 |
| sort | end-NP | | −0.4190 |
| of | | | |
| thing | | | 0.0597 |
| . | | | |
| I | | | |
| don't | | | −1.0114 |
| , | | | |
| not | | | −0.8989 |
| much | | | −0.0505 |
| , | | | |
| with | | | 0.2659 |
| a | start-NP | | |
| few | in-NP | | 0.2414 |
| exceptions | end-NP | | −0.2548 |
| . | | | |

FIG. 1C

SIGNAL PROCESSING APPROACH TO SENTIMENT ANALYSIS FOR ENTITIES IN DOCUMENTS

CROSS-REFERENCE TO RELATED APPLICATIONS

This application is a continuation of U.S. patent application Ser. No. 12/752,053, filed Mar. 31, 2010, to be issued as U.S. Pat. No. 8,725,494 on May 13, 2014, which is hereby incorporated by reference.

BACKGROUND

With the proliferation of content on computer networks it is increasingly useful to have a variety of ways of understanding and organizing content. It is common to understand and organize content by topic, author, relevance, popularity, date, etc. There also is an increasing interest in automated tools that attempt to discern the attitude or sentiments of the author toward the subject of the document, such as whether these attitudes are positive, negative or neutral, and how strong these attitudes or sentiments are. For example, one might want to locate strongly positive reviews of a movie or travel destination.

There are several techniques for processing documents to determine if sentiments expressed in a document are positive or negative. In general, the techniques involve using documents with associated sentiment judgments, and from those documents learning to associate words and phrases with a sentiment magnitude and polarity. Then, phrases are identified in a document, and then the document is scored based on the sentiment magnitudes and polarities found in the document. There are a variety of computational techniques to achieve these results. For example, see Pang, Bo, Lillian Lee, and Shivakumar Vaithyanathan, "Thumbs up? Sentiment Classification using Machine Learning Techniques," in *Proceedings of the Conference on Empirical Methods in Natural Language Processing* (*EMNLP*), pp. 79-86, 2002, and subsequent work. These techniques are commonly used for scoring an entire document, although they can be extended to scoring sentences within a document by treating each sentence as if it were a distinct document.

There also are several techniques for processing documents to find names of different kinds of individual entities (most commonly personal names, geographical names, and organization names) in a document. In general, the techniques involve either looking for occurrences of names from a list within a document, or searching the document to find a set of contexts and features that statistically predict where the names of entities are located in the document. Each entity in the document can be associated with a label from the set of labels found in the annotated training corpus. There are a variety of computational techniques for identifying entities in documents. For example, see McCallum, Andrew and Wei Li, "Early Results for Named Entity Recognition with Conditional Random Fields, Features Induction and Web-Enhanced Lexicons," in *Proc. Conference on Computational Natural Language Learning*, 2003, and subsequent work for further information about the statistical approach to learning to identify named entities.

A newer problem in document analysis involves assigning sentiments values (polarity and magnitude) to entities identified in a document. The problem with most techniques is that sentiment polarity is assigned to an entire document or sentence, whereas all entities in a document or sentence do not necessarily share the same sentiment polarity as the document or sentence as a whole.

One attempt to address this problem is a graph-based approach to using sentiment polarity and magnitudes associated with phrases that are related to an entity in the document to determine a sentiment for the entity. See *Fine-Grained Subjectivity Analysis*, PhD Dissertation, by Theresa Wilson, Intelligent Systems Program, University of Pittsburgh, 2008.

SUMMARY

A document can be processed to provide sentiment values for phrases in the document. The sequence of sentiment values associated with the sequence of phrases in a document can be handled as if they were a sampled discrete time signal. For phrases which have been identified as entities, a filtering operation can be applied to the sequence of sentiment values around each entity to determine a sentiment value for the entity.

Accordingly, in one aspect, a computer-implemented process involves receiving, in a computer memory, data identifying entities described in a document, wherein the document includes a plurality of tokens. Data defining sentiment values assigned to the tokens in the document also is received. The data in the computer memory is processed with a processor to assign a sentiment value to an entity in the document by applying a filter to a sequence of sentiment values corresponding to a sequence of tokens surrounding the entity in the document.

In another aspect, a computer program product includes a computer readable storage having computer program instructions stored therein, wherein the computer program instructions, when processed by a computer, instruct the computer to perform a process for determining sentiment associated with entities. The process involves receiving, in a computer memory, data identifying entities described in a document, wherein the document includes a plurality of tokens, and receiving data defining sentiment values assigned to the tokens in the document. The data in the computer memory is processed with a processor to assign a sentiment value to an entity in the document by applying a filter to a sequence of sentiment values corresponding to a sequence of tokens surrounding the entity in the document.

In another aspect, a computer-implemented process involves receiving, in a computer memory, data identifying entities described in a document, wherein the document includes a plurality of tokens, and receiving data defining a sequence of sentiment values assigned to the tokens in the document. Using a processor, a filter is applied to the sequence of sentiment values in the computer memory such that the sentiment value of a token is spread among other nearby tokens, whereby each entity has contributions due to sentiment values from nearby tokens. For each entity in the document, the processor combines the contributions from nearby tokens to produce a sentiment value for the entity.

In another aspect, a computer program product includes a computer readable storage having computer program instructions stored therein, wherein the computer program instructions, when processed by a computer, instruct the computer to perform a process for determining sentiment associated with entities. The process involves receiving, in a computer memory, data identifying entities described in a document, wherein the document includes a plurality of tokens, and receiving data defining a sequence of sentiment values assigned to the tokens in the document. Using a processor, a filter is applied to the sequence of sentiment values in the computer memory such that the sentiment value of a token is spread among other nearby tokens, whereby each entity has contributions due to sentiment values from nearby tokens. For each entity in the document, the processor combines the contributions from nearby tokens to produce a sentiment value for the entity.

Additional embodiments include one or more computers or computer systems programmed or configured to perform such processes.

In one embodiment, data associating the assigned sentiment value with the entity is output. The data associating the assigned sentiment value with the entity may include a first ordered array of tokens from the document and data, for each entity, defining boundaries of the entity in the first ordered array, and a second ordered array of filtered sentiment values, wherein the order of the filtered sentiment values corresponds to the order of the tokens so as to associate the filtered sentiment values with the tokens.

In another embodiment, the data identifying entities includes a first ordered array of tokens from the document and data, for each entity, defining boundaries of the entity in the first ordered array. The data defining sentiment values assigned to tokens in the document includes a second ordered array of sentiment values. The order of the sentiment values corresponds to the order of the tokens so as to associate the sentiment values with the tokens. In one embodiment, the sentiment value associated with an entity is a function of filtered sentiment values associated with the tokens within the boundaries of the entity. In particular, each filtered sentiment value $b_i$ of the token at position i in the sequence of tokens is determined by the equation:

$$b_i = \Sigma_{j=-N}^{M} a_{(i-j)} * v_{(i-j),-j}$$

where M is the number of tokens after the token at position i, N is the number of tokens before the token at position i, $a_{(i-j)}$ is the sentiment value of token a at position i–j in the sequence of tokens, and $v_{(i-j),-j}$ is the jth weight v associated with the token at position i–j in the sequence of tokens, given an array of values v for each token.

In one embodiment, data defining a sentiment model is received in the computer memory. The data in the computer memory is processed with a processor to assign a sentiment value to each phrase in the document according to the sentiment model.

In one embodiment, each sentiment value includes a sentiment polarity and magnitude.

In one embodiment, the sentiment value of an entity is displayed on a display, in relation to a display of the document. For example, the sentiment value of the entity can be compared with a sentiment associated with the document as a whole and a result of the comparison can be displayed in association with the displayed document. As another example, entities in a document can be sorted by sentiment.

In one embodiment, documents in a repository of documents can be searched for documents that contain an entity with an associated sentiment value. The sentiment values associated with entities in a document can be displayed in search results.

In another embodiment, data specifying an entity and sentiment information are received. After a document is received, it is determined if the document includes the specified entity and sentiment information. A notification is sent to a user if the document includes the specified entity and sentiment information.

In another aspect, a computer-implemented process involves receiving, in a computer memory, data identifying entities described in a document, wherein the document includes a plurality of tokens, and data defining a sequence of sentiment values assigned to the tokens in the document. Using a processor, a filter is applied to the sequence of sentiment values in the computer memory such that the sentiment value of a token is spread among other nearby tokens, whereby each entity has contributions due to sentiment values from nearby tokens. For each entity in the document, the processor combines the contributions from nearby tokens to produce a sentiment value for the entity.

BRIEF DESCRIPTION OF THE DRAWINGS

In the drawings,

FIGS. 1A-C illustrates an example document with phrases, entities, and sentiment polarity and magnitudes annotated.

DETAILED DESCRIPTION

Figure 2:
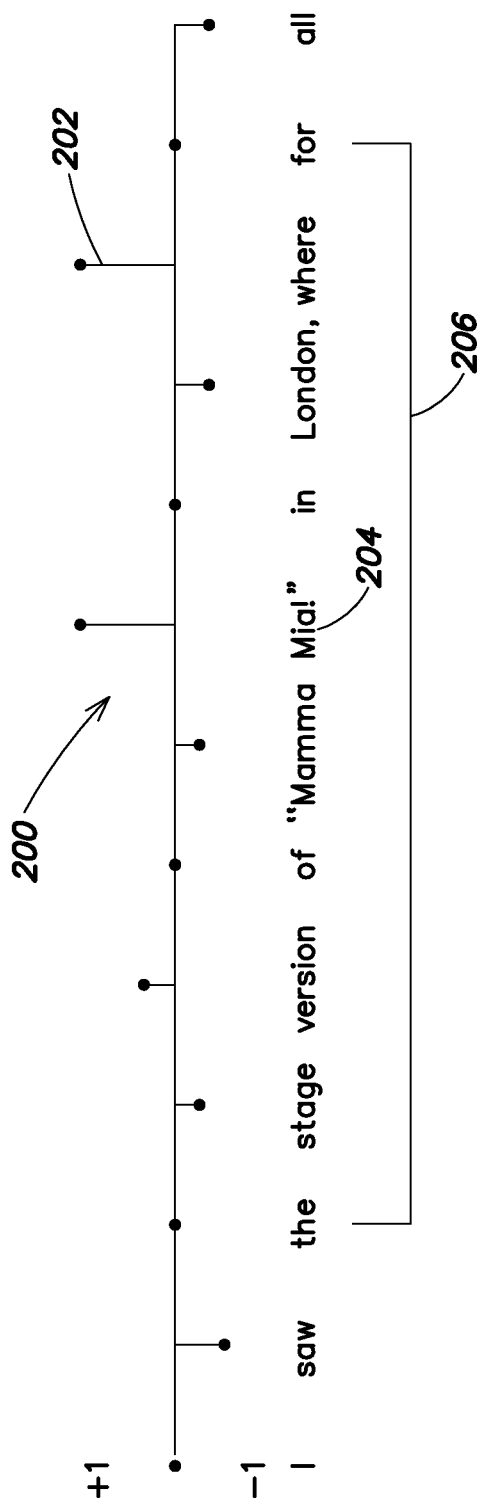
FIG. 2 illustrates a filter applied to a sequence of polarities and magnitudes.

In this document, the following definitions are used. A "document" is data in a computer readable form that includes natural language text, wherein the natural language text includes a plurality of sentences, with each sentence comprising one or more phrases. A "phrase" is a set of one or more sequential words that is contained within a whole sentence. An "entity" is a named noun phrase. A noun phrase is a named noun phrase if it in some way identifies a unique person, place or thing, such as persons, organizations, locations, quantities, percentages and values, identifiers such as email addresses, URIs and credit card numbers, nationalities and religions, facilities and geopolitical units, product names, drugs, genes, proteins, viruses, chemicals, etc.

Referring to FIG. 1, an example document 100, illustrated as an array of tokens 108, noun phrases 102, entities 104, and sentiment values 106 is illustrated. Each word or punctuation mark, or other parseable string, in the document is called a token. For example, the words "stage" 110, "London" 112 and "century" 114 are tokens. Noun phrases 102 are illustrated in the second column of FIGS. 1A-1C. The column indicates, for each token, where the noun phrase starts and ends. Any tokens that are inside of a noun phrase also are labeled as "in" the noun phrase. For example, "stage" 110 is "in" the noun phrase 120, as indicated at 122. "London" is a single word noun phrase as indicated at 124. Noun phrase 126 ends with the token "century" 114 as indicated at 128.

Each token also is assigned a sentiment value, as indicated in the fourth column 106 of FIGS. 1A-1C. For example "stage" 110 has value −0.1887 as indicated at 130, "London" 112 has value −0.3158 as indicated at 132, and "century" 114 has value −0.2874 as indicated at 134. Stop words (such as "of" and "the") and punctuation are assigned neutral, e.g., 0.0, sentiment values which are not shown in column 106. The sentiment value indicates the attitude associated with a topic, such as a document, sentence or phrase, and how strong that attitude is. It can be considered to have two parts, polarity and magnitude. Sentiment polarity indicates the sign of a sentiment (either positive or negative), but is not necessarily binary. Sentiment polarity can be represented by a binary value or a ternary value (allowing neutral to be represented) or other discrete range of values. Sentiment magnitude indicates how strong the sentiment is in the direction of the sentiment polarity. Sentiment magnitude can be represented by a discrete range of non-negative values. A sentiment polarity and a sentiment magnitude are associated with tokens in a document by data such as shown in FIGS. 1A-1C.

The sentiment value for any document part is the average of the sentiment values for the tokens contained in that document part. For example, in FIGS. 1A-1C, the noun phrases are marked. For example, noun phrase 120 includes the tokens "stage version", and thus has a sentiment value of (−0.1887+0.0902)/2=−0.04925. The sentiment value for noun phrase 124, "London," is still −0.3158. The sentiment value for noun phrase 126, "the second century," is (−0.5299+−0.2874)/2=−0.40865. It should be understood that the sentiment values shown in FIGS. 1A-1C are merely illustrative and do not necessarily reflect actual values obtained from a sentiment analysis.

Referring now to FIG. 2, the sequence of sentiment values associated with the sequence of tokens in a document can be handled as if they were a sampled discrete time signal. FIG. 2 illustrates the beginning of the document of FIG. 1A with the sentiment values now presented as a discrete-time signal 200. Each sample, e.g., 202, in the signal corresponds to a token in the document, and the samples are in the order that the tokens appear in the document. A filtering operation applied to this sequence around each entity, e.g., 204, can be used to determine a sentiment value for the entity.

As shown in FIG. 2, a filter having a width 206, in this case 11 tokens, can be applied to the sequence of sentiment values. A variety of kinds of filters are described in more detail below in connection with FIG. 6. In one implementation, the filter is a Gaussian blur filter. Thus, the sentiment value of each phrase is spread in a weighted fashion among the adjacent phrases. From another perspective, the sentiment value for any entity, having a position, e.g. 204, in a sequence of tokens, is a weighted sum of contributions from the sentiment values associated with tokens around this position.

Figure 3:
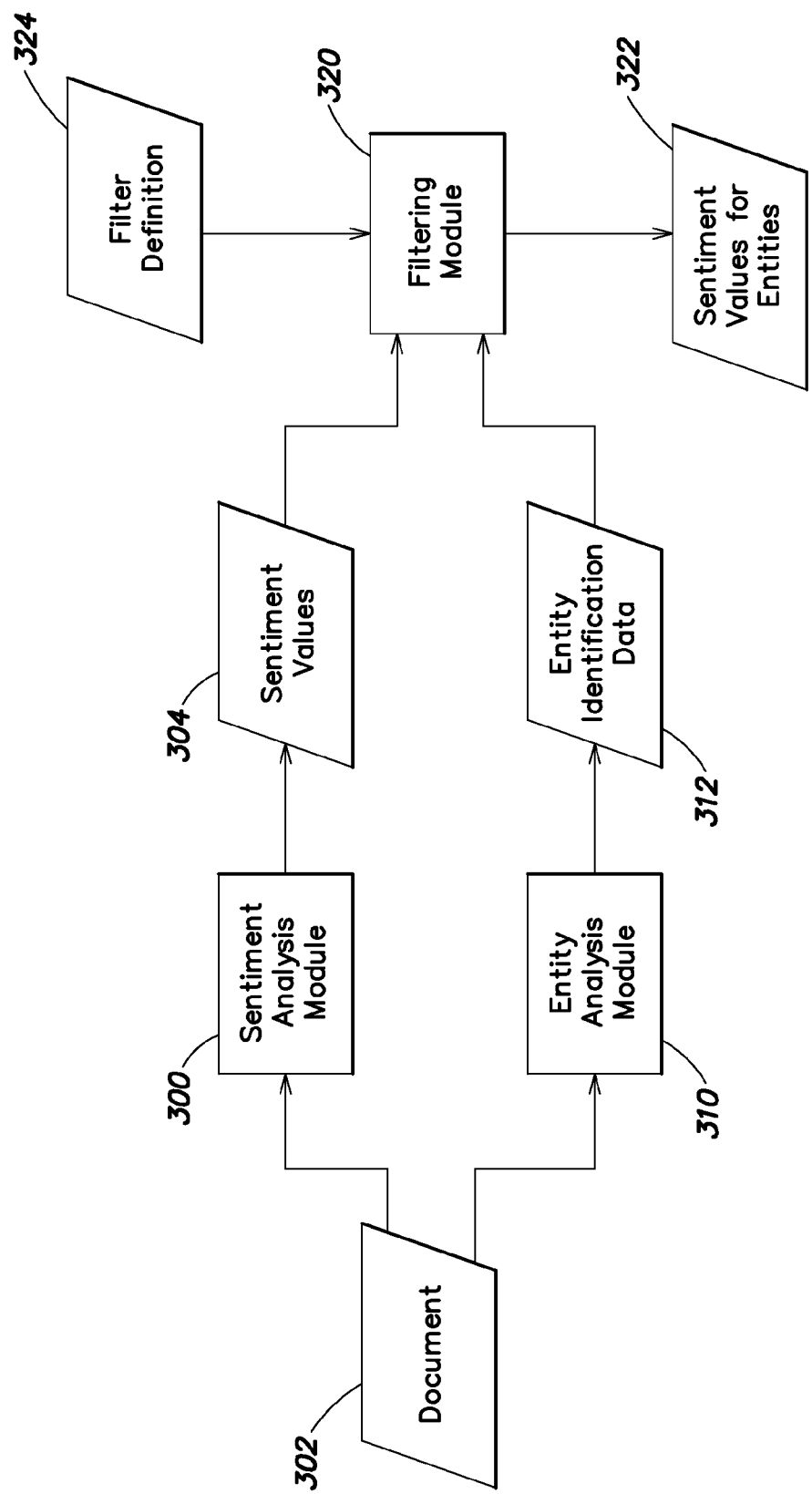
FIG. 3 is a data flow diagram illustrating how sentiment polarities and magnitudes are assigned to entities.

Referring to FIG. 3, a data flow diagram illustrating how sentiment polarities and magnitudes are assigned to entities will now be described.

In FIG. 3, a sentiment analysis module 300 processes a document 302 and assigns sentiment values 304, such as polarities and magnitudes, to tokens in the document. The sentiment analysis module 300 may be implemented using a computer program executed on a general purpose computer. The computer program may implement any of a variety of techniques for sentiment analysis, such as that described in Pang et al. (2002). The document 302 is an electronic document stored in a computer readable data file or in memory of a computer. The data 304 defining sentiment values assigned to tokens in the document 302 are received in memory of a computer. This data 304 can be placed in a variety of data structures. For example, the sentiment values are assigned to each token in the document. Given any standard technique for creating a list of tokens derived from an electronic document, and with that tokenization standard shared between the sentiment analysis module 300 and an entity analysis module 310 (described below), the assigned sentiment values are placed into another list of the same length as the token list for the document, such that the nth value in the sentiment list is associated with the nth token in the token list. For example, the columns 108 and 106 in FIGS. 1A-1C can be implemented as two parallel ordered arrays.

Similarly, an entity analysis module 310 processes the document 302 and identifies entities described in the document. The entity analysis module 310 may be implemented using a computer program executed on a general purpose computer. The computer program may implement any of a variety of techniques for entity analysis, such as that described in McCallum and Li (2003). Data 312 identifying the entities described in the document are received in memory of a computer. There are several techniques for representing the ranges and labels associated with entities in a document. An example data structure is a list of triples (start, end, label) representing each entity, where the start integer is the index of the token that begins the entity, the end integer is the index of the token immediately after the end of the token, and the label string represents the kind of entity found in that position in the document. For example, the information shown if column 104 of FIGS. 1A-1C can be represented as such a list. For example, the first entry in the list would be a triple including the index to the token "London", the index to the token "London" again, because this entity contains only one token, and a label indicating it is a "location."

A filtering module 320 receives the data 312 identifying the entities described in the document 302 and the data 304 defining sentiment values assigned to tokens in the document 302. The filtering module 320 applies a filter defined by parameters 324 to the sequence of sentiment values to generate sentiment values 322 for each of the entities described in the document 302. Such filtering is described in more detail below in connection with FIG. 6. The resulting data structure is similar to the data 304 that defines the sentiment values, but updated to include sentiment values associated with the entities described in the document. For example, an additional parallel ordered array can be created for storing the filtered sentiment values. The sentiment value for an entity is then the average of the filtered sentiment values for the tokens contained within the entity.

Figure 4:
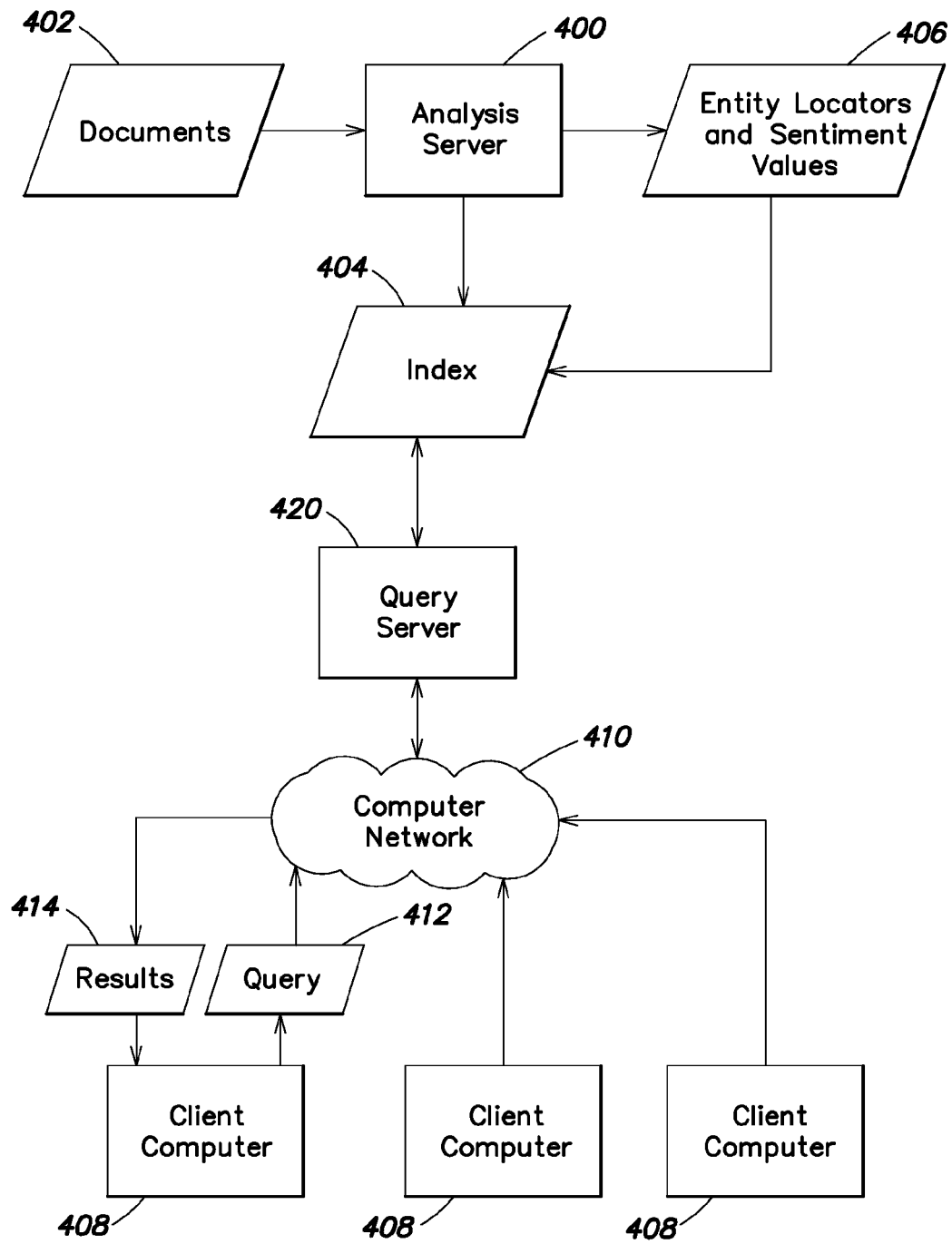
FIG. 4 is a block diagram of an example computer system for assigning sentiment polarities and magnitudes to entities.

Referring now to FIG. 4, a document and information retrieval system implementing the entity-level sentiment analysis of FIG. 3 will now be described. The system includes an analysis server 400 that receives and indexes documents 402 to build an index 404 to permit searching. This analysis server 400 can use any of a variety of indexing techniques. The documents themselves may reside in a separate database or other server. The analysis server 400 also houses the sentiment analysis and entity extraction modules of FIG. 3 which are also used to process the documents to generate sentiment values and entity locators 406 for each document which also are stored in the index 404. The index 404 can be set up to be accessed through a query server 420 by one or more client computers 408 that connect to the query server through a computer network 410. The client computers 408 submit queries 412 or other instructions to the server 400, and the server 400 provides to the client computers the results 414 of the query or other instructions. With sentiment values in the index, queries can include sentiment values. Queries for entities can also include a conjoined query for sentiment polarity or value range. Applications using such a capability are described in more detail below. Within an organization, the network is typically a local area network that permits authorized people from within the organization to access information about that organization's documents through the servers 400 and 420.

Figure 5:
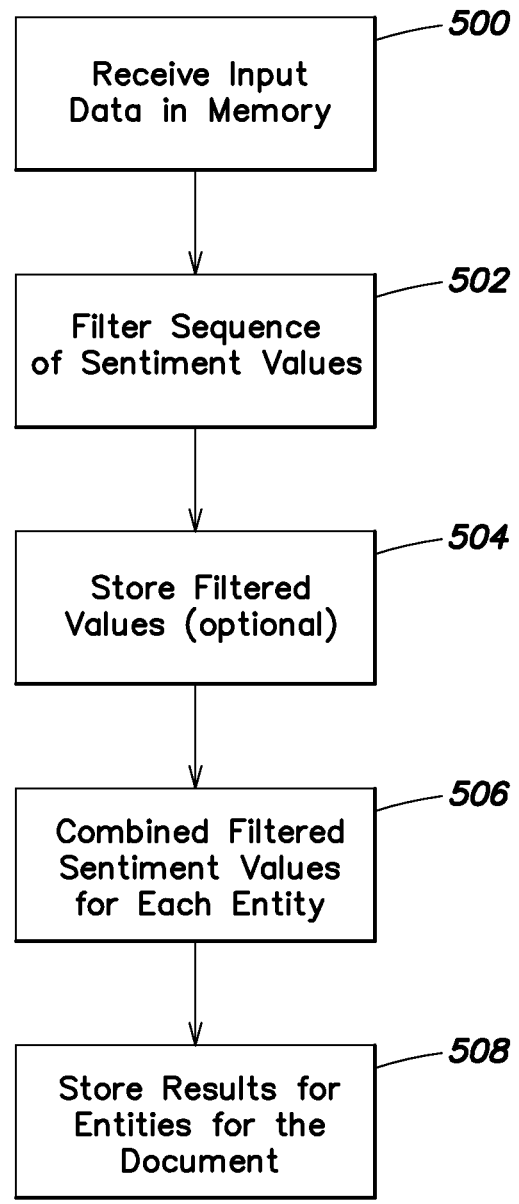
FIG. 5 is a flow chart describing an example process for assigning sentiment polarities and magnitudes to entities.

The process of analyzing sentiment associated with entities will now be described in more detail in connection with the flow chart of FIG. 5. The process starts with receiving 500 input data in a computer memory, whether in persistent storage such as a disk drive or in volatile memory such as RAM. The input data includes data defining a document, including tokens in the document, data identifying entities described in the document, and data defining sentiment values assigned to the tokens in the document. The data in the computer memory is processed with a processor to assign a sentiment value to an entity in the document. In particular, a sequence of sentiment values corresponding to phrases surrounding the entity is filtered 502. The filtered sentiment values optionally are stored 504. For each entity, the filtered sentiment values for the tokens contained within the entity are combined 506, for example by computing the average, to provide sentiment values for the entity. The results for entities in the document are stored (508).

A wide variety of filtering operations could be used; however a class of filters that is particularly useful in this application is based on wavelet transformations, in part because they do not make an assumption that a signal is a combination of sine waves. For this application, one transform uses a series of functions that takes each original impulse (in this application, the sentiment value for a phrase) and spreads it in different ways. The simplest transform is a series of step functions:

$$I = \Sigma_{i=-M}^{N} a_i * s_i \quad (1)$$

where $s_i$ is a signal (of unit strength) in the window $[-M, \ldots, +N]$ relative to the origin of the impulse, and $a_i$ is a strength factor that is constrained so that the sum of all the $s_i$ signals is equal to the magnitude of the impulse I. The distribution of the $a_i$ values over the window N can be a constant distribution, a Gaussian distribution, or other distribution, whether symmetrical (where $|M|=|N|$), or asymmetrical (where $|M|\neq|N|$), with the condition that the sum is equal to the original sentiment value. If a Gaussian distribution is used, its standard deviation can be chosen to approximate the "range of influence" of the sentiment associated with a token, whether within a single sentence or over multiple sentences.

Such a filter function has the properties that (a) the sum of the sentiment values remains the same, and (b) the function simultaneously maps the original sentiment value for each token (or n-gram) in the document to a new value, depending on the context of each token. For example, the filtering function may be a Gaussian blur, but there are many other example, including examples that are in part learned from the training data.

For example, by using varieties of wavelets, the shape of the curve can be modified from a Gaussian distribution by establishing values of $a_i$ for a filter through a training and optimization process. This process uses a corpus of documents with entities already rated with either positive, negative (and optionally neutral) sentiment, with the rating predetermined by humans. In training, parameter weights are assigned to different wavelets, and the parameter weights are changed to adjust the shape of the curve that results from the combination of wavelets, according to how that word, and similar words, actually affected the sentiment of entities in their context. This could produce differently-shaped curves for spreading the sentiment of different words.

The equation (1) above describes how a value may be spread among its neighbors. The following describes how a sentiment value is calculated for a token given that values from the various neighbors have been spread to it. Assuming that, for token $t_i$, an array $v_i$ of scalar values is indexed from $-M$ to $+N$, so that:

$$I = \Sigma_{j=-M}^{N} v_{ij} \quad (2)$$

In other words, the sum of the distributions of weights is the same as the original weight for the token, and therefore that the total sentiment of the document remains the same after this transformation. Then, following the notation above, the weight $b_{ki}$, which is the redistributed weight at position k from position j is:

$$b_{(i+j),i} = v_{ij} * a_i \quad (3)$$

(Note that $v_{ij}$ is zero outside of the range $-M$ to $+N$.) Therefore, the total weight given to position $b_i$ is:

$$b_i = \Sigma_{j=-N}^{M} a_{(i-j)} * v_{(i-j),-j} \quad (4)$$

where M is the number of tokens after the token at position i, N is the number of tokens before the token at position i, $a_{(i-j)}$ is the sentiment value of token a at position i–j in the sequence of tokens, and $v_{(i-j),-j}$ is the jth weight v associated with the token at position i–j in the sequence of tokens, given an array of values v for each token.

Figure 6:
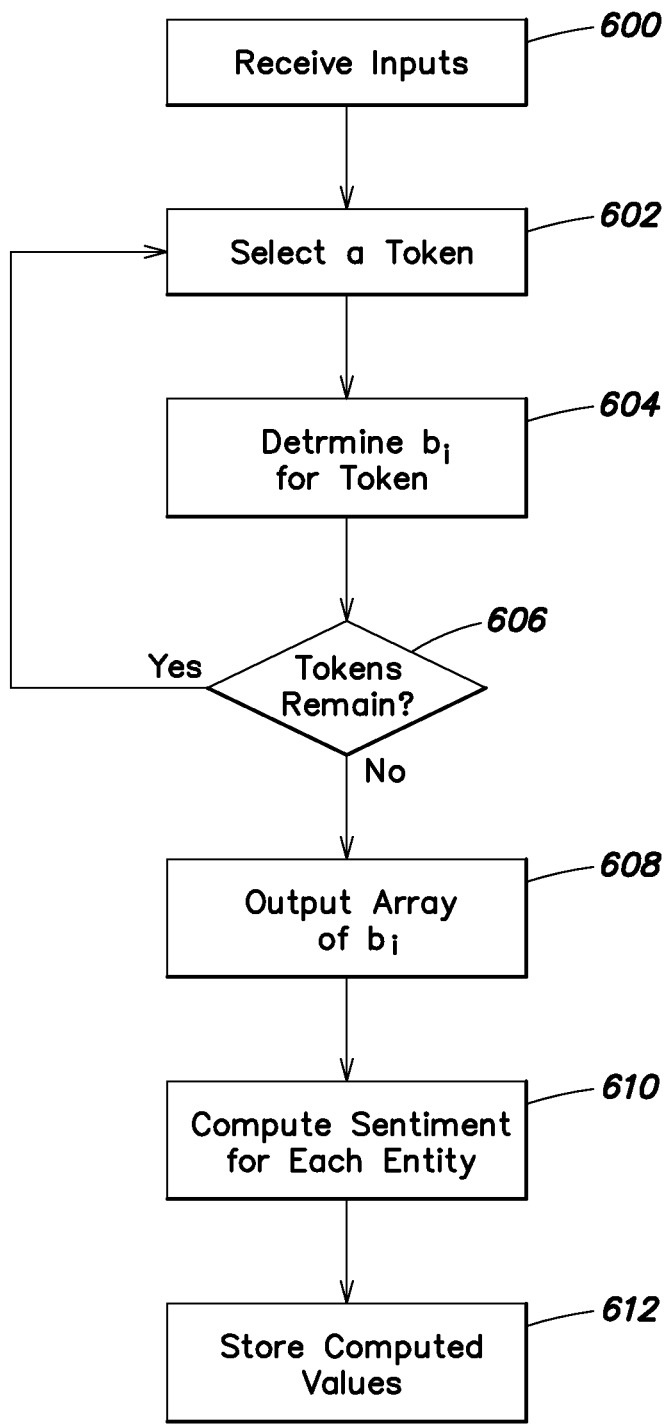
FIG. 6 is a flow chart describing an example filtering operation.

A flow chart for a computer program that implements a filter that uses the formula of equation (4) above will now be described in connection with FIG. 6. The inputs that are received 600 are: an array A of sentiment values $[a_1, \ldots, a_n]$ for each token (or n-gram) in the document, and parameters of the filter function, namely the definition of the window (values M and N) and the array of weights $v_{ij}$. The inputs may reside in memory or in a data file. Next, a token i in the array is selected 602. For the selected token, the computer determines 604 the value of $b_i$. If more tokens remain to be processed, as determined in step 606, the process continues by repeating steps 602 and 604. If no tokens remain to be processed, an array B of filtered token sentiment weights $[b_1, \ldots, b_n]$ is then output 608, for example by being stored in memory or in a data file. Given the locations of the entities in the document, a sentiment value is computed 610 for each entity based on the sentiment values assigned to the tokens in the entity, for example by determining an average. The computed values are then stored 612 in memory or in a data file.

Given the sentiment values associated with each entity, a variety of applications can take advantage of this information. Such capabilities typically would be implemented as part of a document and information retrieval system such as shown in FIG. 4. Such a system could locate documents and/or order the presentation of search results and/or present a document using sentiment values associated with an entity.

For example, information about entities in a document can be displayed to a user. Given a selected entity in a document, the local sentiment for that entity can be identified and displayed. Or, a comparison of the sentiment associated with the entity with the sentiment associated with the document as a whole can be displayed. Or, the entities in the document can be sorted by sentiment, or by relationship to the sentiment of the document as a whole.

As another example, the system could enable a user to formulate queries that uses sentiment values. A user may search for documents containing a specific entity which is associated with a specific sentiment value, or sentiment polarity, or sentiment magnitude. The sentiment values associated with the entities could be displayed to a user as part of the search results. As yet another example, when search results are generated, the sentiment values associated with selected entities, such as those in the search terms, could be shown in a facet as part of search results.

As yet another example, an application can be configured to send notifications, such as an electronic message, as an alert whenever a document is processed which has a sentiment associated with a specified entity. Users could set up alerts by specifying an entity and a sentiment value threshold. The threshold could be a simple polarity (e.g., any negative reference to an entity), or a magnitude (e.g., any strong sentiment about the entity), or both (e.g., any strong negative reference to an entity). A set of notification settings could be examined for each document that is newly added to the information retrieval system. When a newly received document has the specified entity and sentiment value, an electronic notification is sent to the user, or other users specified by the user that set up the notification.

The techniques described above can be implemented in digital electronic circuitry, or in computer hardware, firmware, software executing on a computer, or in combinations of them. The techniques can be implemented as a computer program product, i.e., a computer program tangibly embodied in tangible, machine-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Applications or modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A computing system can include clients and servers. A client and server are generally remote from each other and typically interact over a communication network. The relationship of client and server arises by virtue of computer programs running on the respective computers and having a client-server relationship to each other.

Having described an example embodiment, it should be apparent to those skilled in the art that the foregoing is merely illustrative and not limiting, having been presented by way of example only. Numerous modifications and other embodiments are with the scope of ordinary skill in the art and are contemplated as falling with the scope of the invention.

What is claimed is:

1. A computer system comprising:
   a non-transitory computer readable storage in which data are stored, the data including:
      data identifying entities described in a document, stored in computer memory, wherein the document includes a plurality of tokens appearing in an order in the document, and
      data defining a sequence of sentiment values assigned to the tokens in the document, the sequence of sentiment values being in the order the corresponding tokens appear in the document; and
   at least one processor for processing the data in the computer readable storage to assign a sentiment value to one of the identified entities in the document by:
      applying a filter to the sequence of sentiment values in the non-transitory computer readable storage, the filter having a width defined by a number of tokens, such that the sentiment value of a token is spread among other nearby tokens within the width of the filter, whereby each entity has contributions due to sentiment values from nearby tokens within the width of the filter, and
      for each entity in the document, combining the contributions from the nearby tokens to produce a sentiment value for the entity.

2. The computer system of claim 1, wherein the at least one processor outputs a first ordered array of tokens from the document and data, for each entity, defining boundaries of the entity in the first ordered array, and a second ordered array of filtered sentiment values, wherein the order of the filtered sentiment values corresponds to the order of the tokens so as to associate the filtered sentiment values with the tokens.

3. The computer system of claim 1,
   wherein the data identifying entities comprises a first ordered array of tokens from the document and data, for each entity, defining boundaries of the entity in the first ordered array,
   wherein the data defining sentiment values assigned to tokens in the document comprises a second ordered array of sentiment values, and
   wherein the order of the sentiment values corresponds to the order of the tokens so as to associate the sentiment values with the tokens.

4. The computer system of claim 3, wherein the sentiment value associated with an entity is a function of filtered sentiment values associated with the tokens within the boundaries of the entity.

5. The computer system of claim 1, wherein each sentiment value comprises a sentiment polarity and magnitude.

6. The computer system of claim 5, wherein the at least one processor is further configured to sort entities in a document by sentiment.

7. The computer system of claim 1, wherein the at least one processor is further configured to search for documents in a repository of documents that contain an entity with an associated sentiment value.

8. The computer system of claim 1, wherein the at least one processor is further configured to:
   receive data specifying an entity and sentiment information;
   determine, after a document is received, if the document includes the specified entity and sentiment information; and
   send a notification to a user if the document includes the specified entity and sentiment information.

9. A computer program product, comprising:
   a non-transitory computer readable storage device storing computer program instructions which, when processed by a computer system including at least one processor and a computer memory, enable the at least one processor to:
      access, in the computer memory, data identifying entities described in a document, wherein the document includes a plurality of tokens appearing in an order in the document, and data defining a sequence of sentiment values assigned to the tokens in the document, the sequence of sentiment values being in the order the corresponding tokens appear in the document,
      apply a filter to the sequence of sentiment values in the computer memory, the filter having a width defined by a number of tokens, such that the sentiment value of a token is spread among other nearby tokens within the width of the filter, whereby each entity has contributions due to sentiment values from nearby tokens within the width of the filter, and
      combine, for each entity in the document, the contributions from the nearby tokens to produce a sentiment value for the entity.

10. The computer program product of claim 9, wherein the computer program instructions further enable the at least one processor to output a first ordered array of tokens from the document and data, for each entity, defining boundaries of the entity in the first ordered array, and a second ordered array of filtered sentiment values, wherein the order of the filtered sentiment values corresponds to the order of the tokens so as to associate the filtered sentiment values with the tokens.

11. The computer program product of claim 9,
   wherein the data identifying entities comprises a first ordered array of tokens from the document and data, for each entity, defining boundaries of the entity in the first ordered array,
   wherein the data defining sentiment values assigned to tokens in the document comprises a second ordered array of sentiment values, and
   wherein the order of the sentiment values corresponds to the order of the tokens so as to associate the sentiment values with the tokens.

12. The computer program product of claim 11, wherein the sentiment value associated with an entity is a function of filtered sentiment values associated with the tokens within the boundaries of the entity.

13. The computer program product of claim 9, wherein each sentiment value comprises a sentiment polarity and magnitude.

14. The computer program product of claim 13, wherein the at least one processor is further configured to sort entities in a document by sentiment.

15. The computer program product of claim 9, wherein the at least one processor is further configured to:
   receive data specifying an entity and sentiment information;
   determine, after a document is received, if the document includes the specified entity and sentiment information; and
   send a notification to a user if the document includes the specified entity and sentiment information.

16. A computer program product, comprising:
   a non-transitory computer readable storage device storing computer program instructions which, when processed by a computer system including at least one processor and a computer memory, enable the at least one processor to:
      access the non-transitory computer readable storage in which data are stored, the data including data identifying entities described in a document, wherein the document includes a plurality of tokens appearing in an order in the document, and data defining sentiment values assigned to the tokens in the document, and
      process, using the at least one processor, the data in the non-transitory computer readable storage to assign a sentiment value to one of the identified entities in the document by applying a filter to a sequence of the sentiment values corresponding to a sequence of the tokens in the order the tokens appear in the document, the filter having a width defined by a number of tokens, the entity having a position in the sequence of tokens, the filter providing a combination of contributions of the sentiment values associated with the tokens surrounding the position of the entity in the document within the width of the filter.

17. The computer program product of claim 16, wherein the at least one processor is further configured to output data associating the assigned sentiment value with the entity.

18. The computer program product of claim 17, wherein the data associating the assigned sentiment value with the entity comprises a first ordered array of tokens from the document and data, for each entity, defining boundaries of the entity in the first ordered array, and a second ordered array of filtered sentiment values, wherein the order of the filtered sentiment values corresponds to the order of the tokens so as to associate the filtered sentiment values with the tokens.

19. The computer program product of claim 16,
   wherein the data identifying entities comprises a first ordered array of tokens from the document and data, for each entity, defining boundaries of the entity in the first ordered array,
   wherein the data defining sentiment values assigned to tokens in the document comprises a second ordered array of sentiment values, and
   wherein the order of the sentiment values corresponds to the order of the tokens so as to associate the sentiment values with the tokens.

20. The computer program product of claim 19, wherein the sentiment value associated with an entity is a function of filtered sentiment values associated with the tokens within the boundaries of the entity.

* * * * *

UNITED STATES PATENT AND TRADEMARK OFFICE
CERTIFICATE OF CORRECTION

| | |
|---|---|
| PATENT NO. | : 9,436,674 B2 |
| APPLICATION NO. | : 14/270507 |
| DATED | : September 6, 2016 |
| INVENTOR(S) | : John O'Neil |

It is certified that error appears in the above-identified patent and that said Letters Patent is hereby corrected as shown below:

In the Specification

Column 3, line 32, change "$b_i = \Sigma_{j=-N}^{M} a_{(i-j)} * v_{(i-j),-j}$" to read as -- $b_i = \Sigma_{j=-N}^{M} a_{(i-j)} * v_{(i-j),-j}$ --.

Column 7, line 31, change "$I = \Sigma_{i=M}^{N} a_i * s_i$" to read as -- $I = \Sigma_{i=-M}^{N} a_i * s_i$ --.

Column 8, line 7, change "$1 = \Sigma_{j=-}^{N} v_{ij}$" to read as -- $1 = \Sigma_{j=-M}^{N} v_{ij}$ --.

Column 8, line 20, change "$b_i = \Sigma_{j=-N}^{M} a_{(i-j)} * v_{(i-j),-j}$" to read as -- $b_i = \Sigma_{j=-N}^{M} a_{(i-j)} * v_{(i-j),-j}$ --.

Signed and Sealed this
Fifteenth Day of November, 2016

Michelle K. Lee
*Director of the United States Patent and Trademark Office*